(12) United States Patent
Hiraide

(10) Patent No.: US 11,402,568 B2
(45) Date of Patent: Aug. 2, 2022

(54) LIGHT EMITTING DEVICE

(71) Applicant: NICHIA CORPORATION, Anan (JP)

(72) Inventor: Noriaki Hiraide, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 17/550,677

(22) Filed: Dec. 14, 2021

(65) Prior Publication Data

US 2022/0187530 A1 Jun. 16, 2022

(30) Foreign Application Priority Data

Dec. 15, 2020 (JP) .............................. JP2020-207524

(51) Int. Cl.
*F21V 8/00* (2006.01)

(52) U.S. Cl.
CPC ......... *G02B 6/0073* (2013.01); *G02B 6/0021* (2013.01); *G02B 6/0028* (2013.01)

(58) Field of Classification Search
CPC ... G02B 6/0073; G02B 6/0021; G02B 6/0028
See application file for complete search history.

(56) References Cited

U.S. PATENT DOCUMENTS

| | | | |
|---|---|---|---|
| 2004/0041984 A1 | 3/2004 | Tani et al. | |
| 2008/0030691 A1* | 2/2008 | Godo | G02B 27/09 |
| | | | 257/E33.071 |

FOREIGN PATENT DOCUMENTS

| | | |
|---|---|---|
| JP | 2004-093623 A | 3/2004 |
| JP | 2004-212726 A | 7/2004 |
| JP | 2005-353816 A | 12/2005 |
| JP | 2007-148271 A | 6/2007 |
| JP | 2007-288169 A | 11/2007 |
| JP | 2011-128191 A | 6/2011 |
| JP | 2014-126604 A | 7/2014 |
| JP | 2015-088410 A | 5/2015 |

\* cited by examiner

*Primary Examiner* — Mary Ellen Bowman
(74) *Attorney, Agent, or Firm* — Global IP Counselors, LLP

(57) ABSTRACT

A light emitting device includes a light source, a light guide member, and a defining member. The light source is configured to emit light. The light guide member is configured to guide the light and having a light incident end surface on which the light is to be incident. The defining member is arranged between the light source and the light guide member to define a distance between the light source and the light incident end surface of the light guide member. The defining member includes a light passage member configured to allow the light to pass between the light source and the light incident end surface, and a light transmission member configured to transmit the light between the light passage member and the light incident end surface. The light source is spaced apart from the light transmission member.

13 Claims, 11 Drawing Sheets

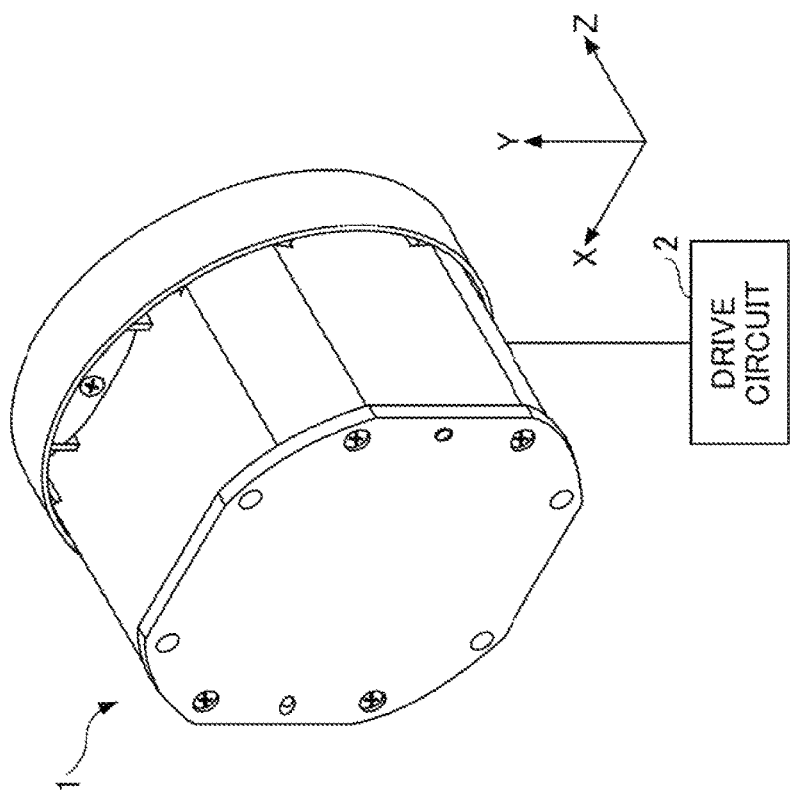
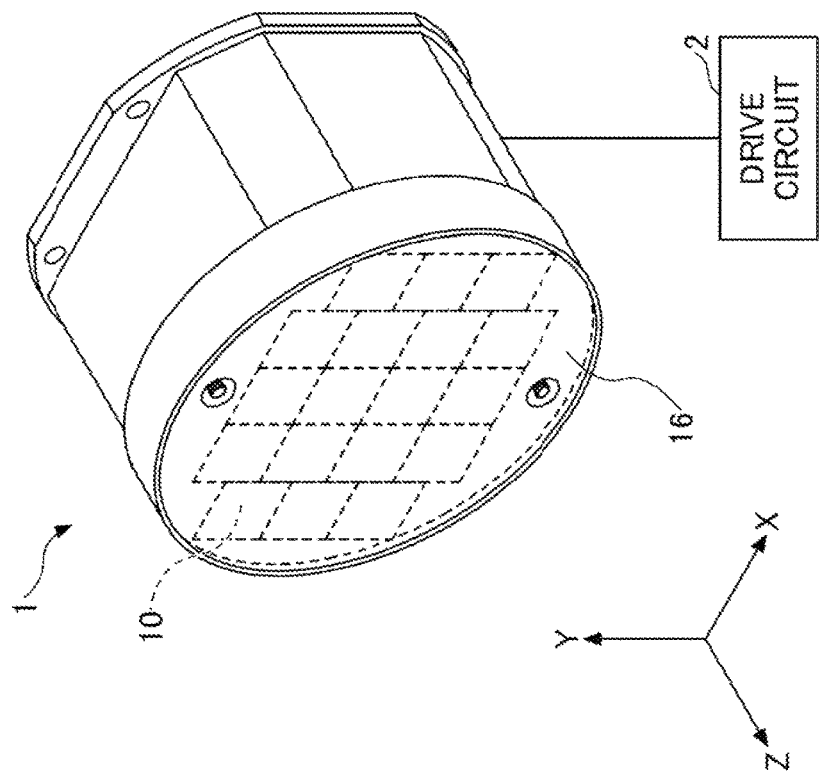

FIG.4
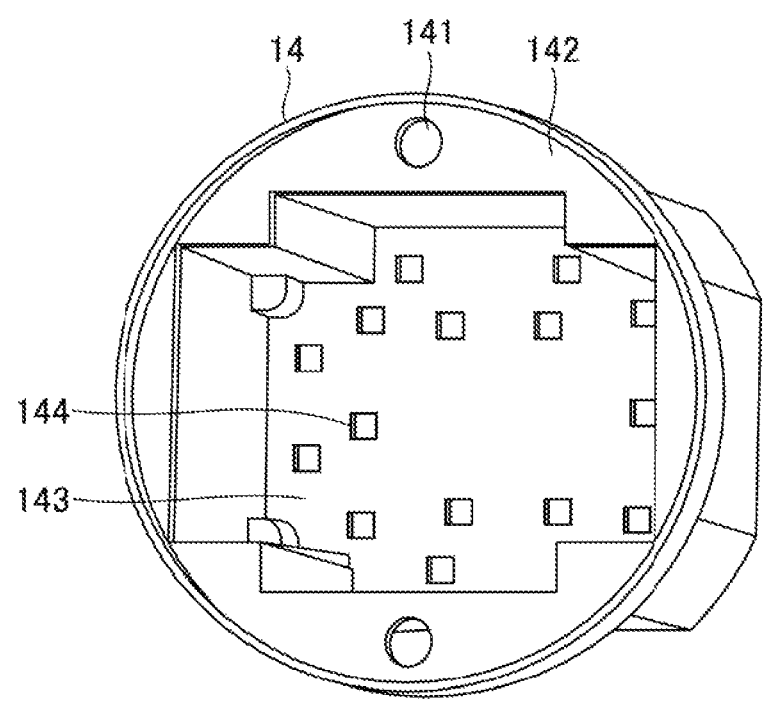
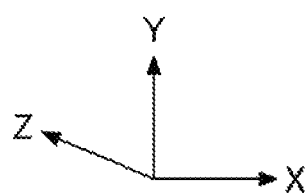

LIGHT EMITTING DEVICE

CROSS-REFERENCE TO RELATED APPLICATIONS

This application claims priority to Japanese Patent Application No. 2020-207524, filed on Dec. 15, 2020. The entire disclosure of Japanese Patent Application No. 2020-207524 is hereby incorporated herein by reference.

BACKGROUND

The present disclosure relates to a light emitting device.

There have been known light emitting devices that allow controlling of light distribution to walls and floors, and to signboards, of stores/facilities etc., for the purpose of space rendering. For example, JP 2015-088410 A discloses a light emitting device including a plurality of LED elements configured to emit light and a plurality of rods each configured to direct light emitted from a corresponding one of the LED elements. The light exit surfaces of the plurality of rods are in close proximity to, in contact with each other, or formed integrally with each other into a certain form (see JP 2015-088410 A, for example).

SUMMARY

However, the light emitting device disclosed in JP 2015-088410 A has room for improvement in preventing contact between the light sources and the light guide members while reducing deterioration in efficiency of incidence of the light emitted from the light sources, such as the LED elements, on the light guide members such as the rods.

An object of the present disclosure is to prevent contact between a light source and a light guide member while reducing reduction in light incidence efficiency on the light guide member.

A light emitting device according to an embodiment of the present disclosure includes a light source, a light guide member, and a defining member. The light source is configured to emit light. The light guide member is configured to guide the light and having a light incident end surface on which the light is to be incident. The defining member is arranged between the light source and the light guide member to define a distance between the light source and the light incident end surface of the light guide member. The defining member includes a light passage member configured to allow the light to pass between the light source and the light incident end surface, and a light transmission member configured to transmit the light between the light passage member and the light incident end surface. The light source is spaced apart from the light transmission member.

According to an embodiment of the present disclosure, it is possible to prevent contact between a light source and a light guide member while reducing the reduction in light incidence efficiency on the light guide member.

BRIEF DESCRIPTION OF DRAWINGS

FIGS. 1A and 1B are diagrams schematically illustrating an overall configuration example of a light emitting device according to one embodiment, where FIG. 1A is a schematic perspective view when viewed from a light emission direction side, and FIG. 1B is a schematic perspective view when viewed from a side opposite to the light emission direction.

FIG. 3A is a schematic front view, FIG. 3B is a schematic side view, and FIG. 3C is a schematic rear view.

FIG. 4 is a view schematically illustrating a configuration example of a holder member according to one embodiment.

FIG. 6A is a diagram of a first example, and FIG. 6B is a diagram of a second example.

FIG. 7A is a schematic diagram when viewed from the light emission side, and FIG. 7B is a schematic diagram when viewed from the side opposite to the light emission side.

FIG. 9A is a diagram schematically illustrating a comparative example, and FIG. 9B is a diagram illustrating one embodiment.

DETAILED DESCRIPTION

Figure 2:
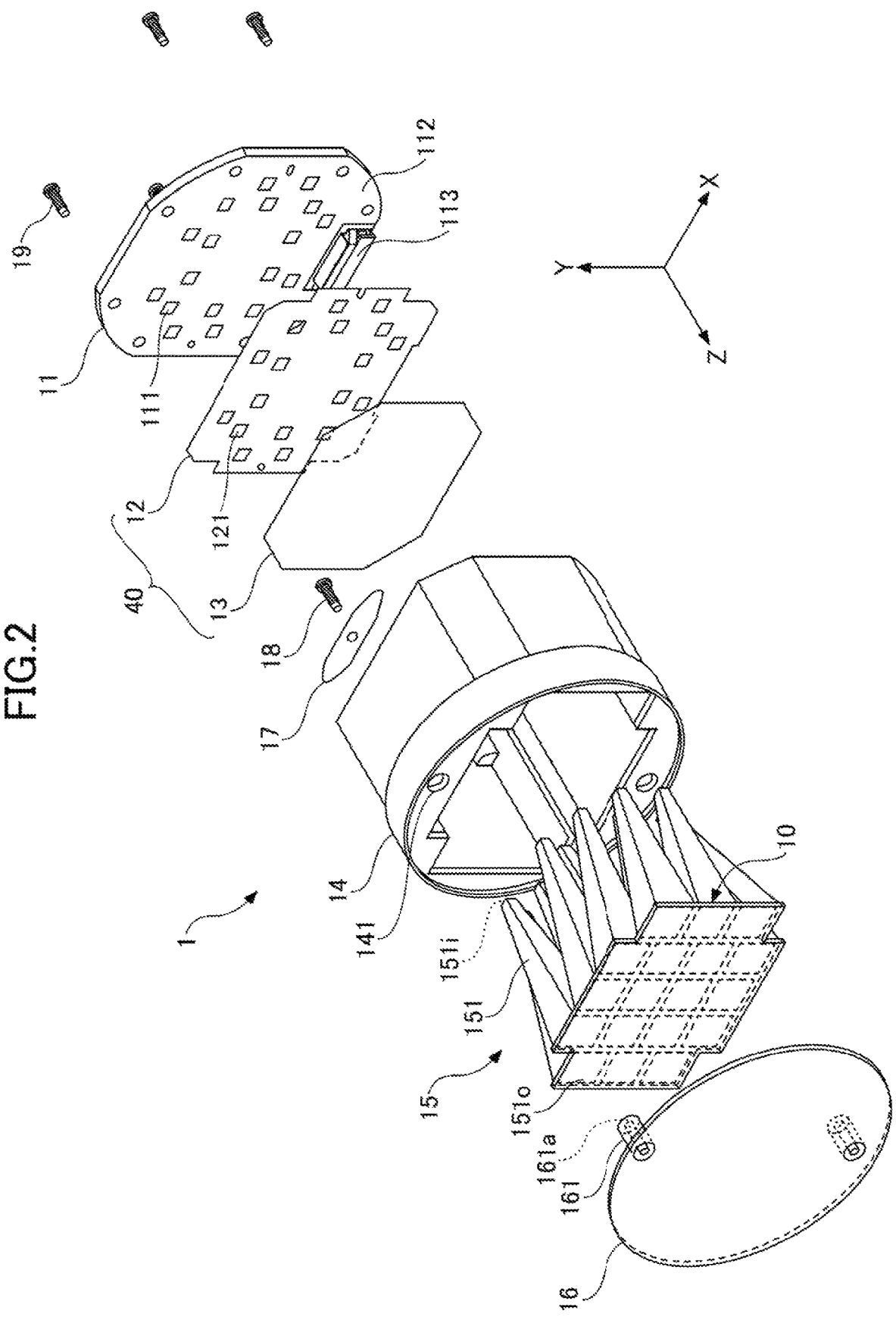
FIG. 2 is an exploded perspective view schematically illustrating an overall configuration example of the light emitting device according to one embodiment.

Hereinafter, certain embodiments of the invention will be described with reference to the drawings. In the description below, portions having the same numerals in a plurality of the drawings indicate the same or similar portions or members.

Further, the embodiment described below are intended as illustrative of a light emitting device to give a concrete form to the technical idea of the present invention, and the scope of the present invention is not limited to the embodiment described below. The sizes, materials, shapes, and the relative configuration etc., of the components described in embodiments are given as an example and not as a limitation to the scope of the invention unless specifically described otherwise. The sizes and the positional relationships of the members in each of the drawings are occasionally shown exaggerated for ease of explanation.

The X direction along the X-axis may indicate a direction in the array plane where the light sources in the light emitting device for an embodiment are arrayed. The Y direction along the Y-axis indicates the direction perpendicular to the X direction in the array plane, and the Z-axis indicates the direction perpendicular to the array plane.

The direction in which the arrow is oriented in the X direction is indicated as a positive X (+X) direction, and the direction opposite to the positive X direction is indicated as a negative X (−X) direction. The direction in which the arrow is oriented in the Y direction is indicated as a positive Y (+Y) direction, and the direction opposite to the positive Y direction is indicated as a negative Y (−Y) direction. The direction in which the arrow is oriented in the Z direction is indicated as a positive Z (+Z) direction, and the direction opposite to the positive Z direction is indicated as a negative Z (−Z) direction. In the embodiments described below, an example in which the light emitting devices are configured to emit light toward the positive Z direction side will be described. Such an illustration does not limit the orientation of the light emitting device during use, and the light emitting device may be oriented in any appropriate direction.

Configuration of Light Emitting Device 1

The configuration of a light emitting device 1 according to one embodiment will be described.

Overall Configuration Example

FIGS. 1A and 1B are diagrams schematically illustrating an overall configuration example of the light emitting device 1. FIG. 1A is a schematic perspective view of the light emitting device 1 when viewed from a light emission side (the positive Z direction) side, and FIG. 1B is a schematic perspective view of the light emitting device 1 when viewed from the negative Z direction side.

As illustrated in FIGS. 1A and 1B, the light emitting device 1 includes a window member 16 configured to transmit light and an opening 10 through which the light passes, the window member 16 and the opening 10 located at the positive Z direction side. Further, the light emitting device 1 has a substantially cylindrical external shape. The opening 10 is provided on an inner side (the negative Z direction side) of the window member 16. The light emitting device 1 can emit light through the opening 10 and the window member 16 toward the positive Z direction side when a drive voltage is applied from a drive circuit 2.

The light emitting device 1 is secured to a wall or a ceiling of a building, for example, and is used as a lighting device configured to illuminate a space inside or outside the building. Alternatively, the light emitting device 1 is fixed to a wall or a ceiling of a store/facility and is used in applications such as a downlight, a spotlight, and indirect lighting for the purpose of space rendering of stores/facilities. The light emitting device 1 can also be installed in a movable structure such as a vehicle, and can also be used in applications such as a headlight that illuminates the surroundings of the movable structure.

While an example of the light emitting device 1 having a substantially cylindrical external shape is illustrated in FIGS. 1A and 1B, the light emitting device 1 may have other external shapes and can have any appropriate external shape, such as a prism shape.

FIG. 2 is an exploded perspective view schematically illustrating an example of the overall configuration of the light emitting device 1. As illustrated in FIG. 2, the light emitting device 1 includes a light emitting diode (LED) mounting substrate 11, a defining member 40, a holder member 14, a light guide member array 15, the window member 16, and flat springs 17.

In the light emitting device 1, the LED mounting substrate 11, a spacer 12, a glass plate 13, and the holder member 14 are aligned in this order along the Z direction and are secured by screwing with securing screws 19 into female screw holes in the holder member 14.

Further, in the light emitting device 1, the holder member 14, the light guide member array 15, and the window member 16 are aligned in this order along the Z direction and are secured by screwing with the securing screws 18 into female screw holes 161a in protruding portions 161 of the window member 16 through the flat springs 17.

The LED mounting substrate 11 is a substantially square plate-shaped member, and is a substrate provided with wirings to which a light source, such as an LED, and various electrical elements can be mounted. For example, a metal-based two-layer printed circuit board formed of aluminum, copper, or the like can be used for the LED mounting substrate 11. A substrate other than a metal-based substrate, such as a paper-epoxy substrate or a glass epoxy substrate, can also be used, but a metal-based substrate is preferable in terms of heat dissipation.

In the illustrated example, the LED mounting substrate 11 has eighteen LEDs 111. The eighteen LEDs may be collectively referred to as the "LEDs 111". Each of the LEDs 111 is an example of a light source configured to emit light and is mounted on a placement surface 112, which is a surface of the LED mounting substrate 11 in the positive Z direction.

Further, the LED mounting substrate 11 includes a connector 113 for connecting the LED mounting substrate 11 to the drive circuit 2 via an electrical cable. Each of the LEDs 111 is electrically connected to the drive circuit 2 via the LED mounting substrate 11, and is configured to emit light in response to a drive voltage applied from the drive circuit 2.

The LED 111 is configured to emit, for example, white light. The LED 111 may be configured to emit light of a color other than white, and may be configured to emit monochromatic light. When the LED 111 is configured to emit white light, the white light can be selected from among various types including a light bulb color, a daytime white color, a daylight color, and the like.

For the LEDs 11, for example, a product designated by a product number NFSWE11A manufactured by Nichia Corporation, or the like can be used. In terms of efficiency of incidence of light on the light guide member array 15, it is preferable to reduce the amount of light traveling in oblique directions from the LED 111.

The defining member 40 includes the spacer 12 and the glass plate 13, and defines a distance between the LED 111 and a light guide member 151.

The spacer 12 is an example of a light passage member that allows light emitted from the LED 111 to pass between the LED 111 and a light incident end surface 151$i$ of a light guide member 151 included in the light guide member array 15. The spacer 12 is disposed between the placement surface 112 on which the LEDs 111 are placed and the light incident end surface 151$i$ in the Z direction. The light incident end surface 151$i$ faces the LED 111, and is an end surface through which the light emitted from the LED 111 enters the light guide member 151. The spacer 12 preferably has a thickness greater than a thickness of the LED 111.

The spacer 12 is a substantially rectangular plate-shaped member and includes eighteen spacer-through holes 121, each having a rectangular shape in a plan view of the spacer 12, at positions each corresponding to a respective one of eighteen LEDs 111 mounted on the LED mounting substrate 11, when the spacer 12 is placed in alignment with the LED mounting substrate 11. The eighteen spacer through holes 121 may be collectively referred to as the "spacer through holes 121".

The spacer 12 can be produced by forming the spacer through holes 121 in a plate-shaped member using a laser machining method, etc. Any appropriate material may be used for a material of the spacer 12, but aluminum is preferable because aluminum has sufficient strength to prevent deformation of gaps over time and has high heat dissipation performance for heat generated by the LEDs 111. Further, in order to reduce flare light, ghost light, or the like, a surface treatment such as blackening is more preferably performed on the spacer 12.

The spacer 12 has planar regions at the negative Z direction side and the positive Z direction sides, excluding regions in which the spacer through holes 121 are formed. The planar region at the negative Z direction side is in contact with a surface of the LED mounting substrate 11 on which the LEDs 111 are placed, and the planar region at the positive Z direction side is in contact with the glass plate 13. When the LED mounting substrate 11, the spacer 12, and the glass plate 13 in this state are secured to the holder member 14, the distance between each LED 111 and a corresponding light guide member 151 facing each other across the spacer through hole 121 is defined to be a predetermined distance. This predetermined distance corresponds to a distance between a light emitting surface of the LED 111 and the light incident end surface 151i of the light guide member 151. The predetermined distance is defined based on a thickness of the spacer 12 and a thickness of the glass plate 13.

The glass plate 13 is disposed between the spacer 12 and the light incident end surfaces 151i, and is an example of a light transmission member configured to transmit light emitted from the LEDs 111. The glass plate 13 is a plate-shaped member containing a glass material adapted to transmit light emitted from the LEDs 111. While the smaller a thickness of the glass plate 13, the higher an incidence efficiency, strength also needs to be secured. When considering reduction in the incidence efficiency, a thickness of the glass plate 13 is preferably 1.0 mm or less, and more preferably 0.5 mm or less. In one example, the glass plate 13 has a thickness of 0.21 mm. To reduce reflection of the light emitted from the LEDs 111 and increase the incidence efficiency on the light guide member 151, it is preferable to provide an anti-reflection (AR) film on a surface of the glass plate 13 on the LED 111 side, or on both surfaces of the glass plate 13 on the LED 111 side and the opposite side, using a coating technique or the like.

The holder member 14 is a box-like member that is hollow inside, and is open on the positive Z direction side. Further, eighteen holding holes 144 are defined in a bottom surface portion of the holder member 14, on the negative Z direction side. The holder member 14 holds the light guide member array 15 inside the holder member 14, in a state in which end portions of the eighteen light guide members 151 included in the light guide member array 15 are inserted into respective eighteen holding holes 144. Further, two engagement through holes 141 are formed in a front surface portion, located on the positive Z direction side, of the holder member 14. The holding holes 144 are illustrated in FIG. 4.

The holder member 14 is produced by, for example, injection-molding a resin material. To hinder light emitted from the LEDs 111 from leaking to the outside of the light emitting device 1, and to hinder visible light, such as sunlight, from entering the interior of the light emitting device 1 from the outside, a material that does not transmit the light emitted from the LEDs 111 and visible light is preferably used for the resin material of the holder member 14. Further, a material that has a linear expansion coefficient that allows for reducing thermal deformation due to heat generated by the LEDs 111 or irradiation with light emitted from the LEDs 111 is preferably used for the resin material of the holder member 14. Examples of the resin material include thermoplastic resins such as a polyphenylene sulfide (PPS) resin, a polycarbonate (PC) resin, an acrylic poly methyl methacrylate (PMMA) resin, an acrylonitrile butadiene styrene (ABS) resin, and a polyether ether ketone (PEEK) resin. The material of the holder member 14 is not limited to a resin, and the holder member 14 may be formed using a metal material such as an aluminum alloy.

The light guide member array 15 in the illustrated example includes the eighteen light guide members 151 that are arrayed in the array plane in a two-dimensional array. The eighteen light guide members 151 may be collectively referred to as the "light guide members 151". Each of the light guide members 151 has a tapered shape that narrows toward the light incident end surface 151i. A cross section of each light guide member 151 intersecting a light guide direction of the light guide member 151 has a square shape.

The term "tapered shape" in the present specification refers to a shape of a long and narrow member in which the diameter, width, thickness, or the like is gradually reduced. In the present embodiment, when each of the light guide members 151 has a shape that narrows toward the light incident end surface 151i, the shape will be referred to as a tapered shape, even when inclinations of lateral surfaces of each light guide member 151 are not symmetrical with respect to the central axis of the respective light guide member 151. In the present embodiment, each of the light guide members has a rectangular shape in a cross section intersecting the central axis of the respective light guide member, but the cross-sectional shape may be other shape, such as a circular shape.

The light guide members 151 adjacent to each other are connected to each other on a light exit end surface 151o side, and eighteen light exit end surfaces 151o constitute the opening 10 of the light emitting device 1. On the light incident end surface 151i side of the light guide member array 15, adjacent light guide members 151 are separated from each other, and a gap between lateral surfaces of the adjacent light guide members 151 is widened toward the light incident end surfaces 151i. The light incident end surfaces of the eighteen light guide members 151 may be collectively referred to as the "light incident end surfaces 151i", and the light exit end surfaces of the eighteen light guide members 151 may be collectively referred to as the "light exit end surfaces 151o".

Light emitted from the LEDs 111 enters the light guide members 151 through the light incident end surfaces 151i. The incident light is guided through a corresponding light guide member 151 while repeating total reflection on lateral surfaces of the light guide member 151, which are the tapered surfaces of each light guide member 151, and exits through a corresponding light exit end surface 151o.

To produce the light guide member array 15, a resin material adapted to transmit light emitted from the LEDs 111 is injection-molded, resulting in eighteen light guide members 151 integrally formed with each other. A silicone resin, a polycarbonate resin, an acrylic resin, or the like can be used for the resin material.

The window member 16 is a plate-like member that contains a resin material adapted to transmit light emitted from the LEDs 111. The window member 16 is an example of a pressing member that presses the light exit end surfaces 151o of the light guide members 151. The window member 16 includes the two protruding portions 161 at positions corresponding to the two engagement through holes 141 defined in the holder member 14. Each of the protruding portions 161 defines the female screw hole 161a. The window member 16 is produced by injection-molding a resin material. An acrylic resin, a polycarbonate resin, or the like can be used for the resin material. The window member 16 can also be made of a glass material.

With the holder member 14 in a state of holding the light guide member array 15, the window member 16 is attached to the holder member 14 such that the protruding portions 161 are fitted into the engagement through holes 141. In this state, the holder member 14 and the window member 16 are connected to each other by screwing with the fixing screws 18 into the female screw holes 161a of the protruding portions 161 through the flat springs 17.

The window member 16 is connected to the holder member 14 and presses the light exit end surfaces 151o. The window member 16 is connected to the holder member 14 without pressing the light exit end surfaces 151o, and when the light guide members 151 expand, the window member 16 presses the light exit end surfaces 151o. The window member 16 also functions as a protective member that prevents dirt, dust, and the like from entering the holder member 14, and also prevents the light guide member array 15 from coming directly into contact with external objects.

The flat spring 17 is a plate-like member containing a metal material such as stainless steel. The flat spring 17 is an elastic thin plate, and is an example of an elastic member that alleviates the pressing force exerted to the light exit end surfaces 151o by the window member 16.

Screwing through the flat springs 17 allows for reducing the connecting force between the holder member 14 and the window member 16. Accordingly, the window member 16 also moves more easily toward the positive Z direction side, compared to a case of screwing without the flat springs 17. With this structure, when the light guide members 151 expand toward the positive Z direction side due to thermal expansion or the like, the pressing force exerted by the window member 16 and pressing the light exit end surfaces 151o toward the negative Z direction side is reduced.

The quantity, arrangement, external shape, and the like of the LEDs 111, the spacer through holes 121, and the light guide members 151 illustrated in FIG. 2 are exemplary and can be selected as appropriate according to the purpose of the light emitting device 1.

Configuration Example of Light Guide Member Array 15

Figure 3B:
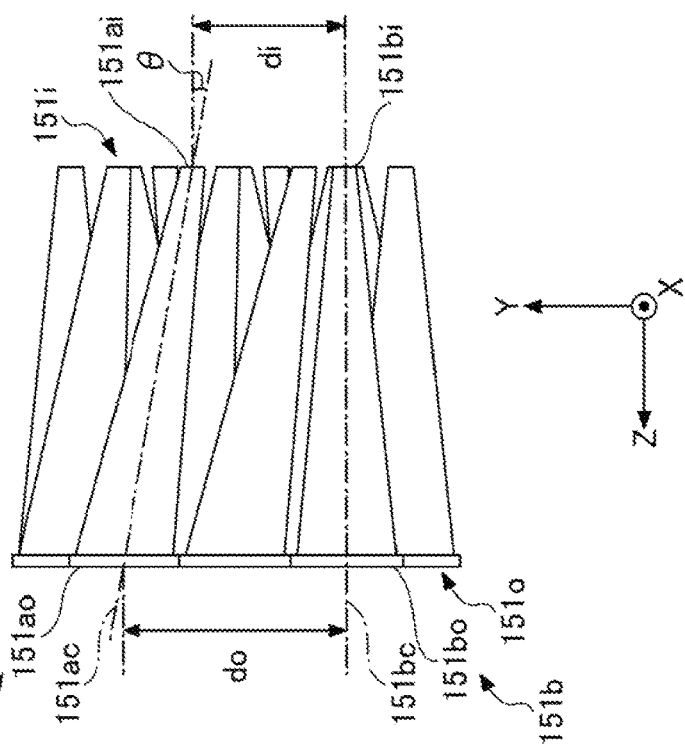
FIGS. 3A, 3B, and 3C are diagrams schematically illustrating a configuration example of a light guide member array according to the embodiment, where
Figure 3A:
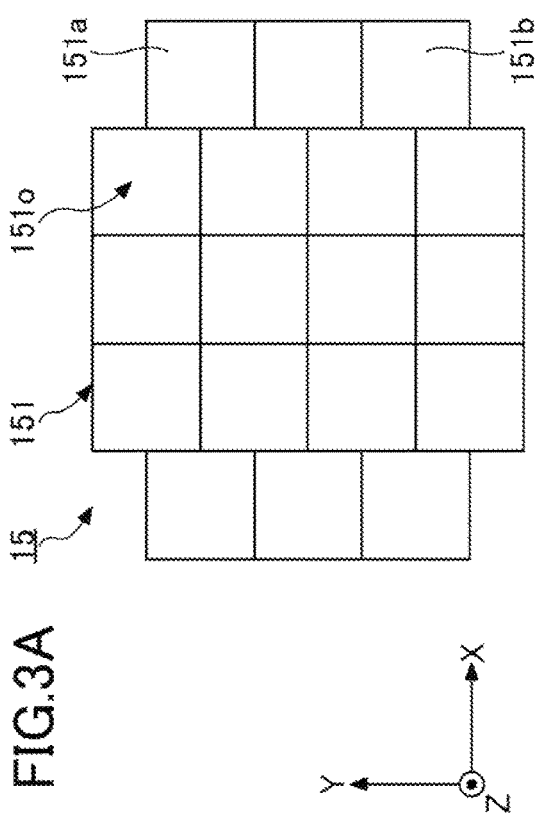
Figure 3C:
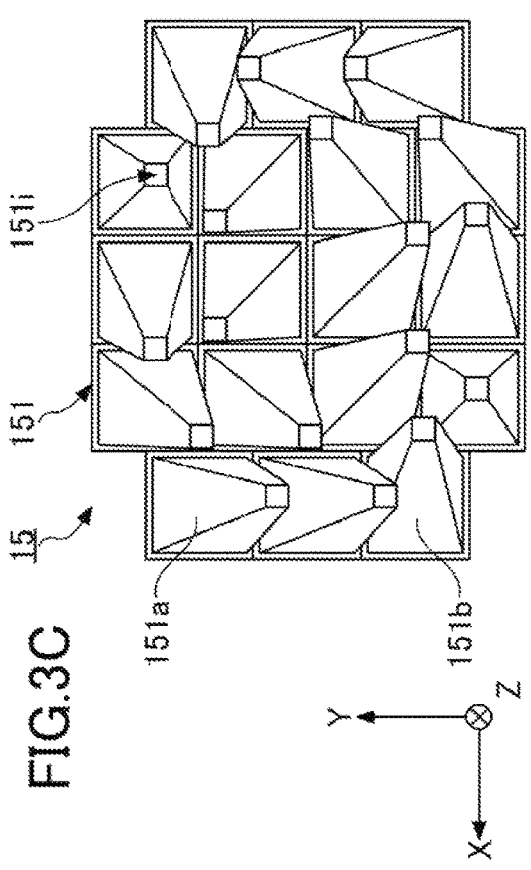

Next, the configuration of the light guide member array 15 will be described with reference to FIGS. 3A, 3B, and 3C. FIGS. 3A, 3B, and 3C are diagrams schematically illustrating a configuration example of the light guide member array 15. FIG. 3A is a front view, FIG. 3B is a side view, and FIG. 3C is a rear view.

As illustrated in FIGS. 3A, 3B, and 3C, the light guide member array 15 includes the 18 light guide members 151 in the array plane along the light incident end surfaces 151i. Each of the light guide members 151 includes the light incident end surface 151i and the light exit end surface 151o. The light incident end surface 151i has a substantially square shape with each side having a length of 2.2 mm, and the light exit end surface 151o has a substantially square shape with each side having a length of 10.0 mm. Further, a height (a length in the Z direction) of the light guide member array 15 is 35 mm.

The sizes described above are examples, and the shape of each light guide member 151 is determined based on specifications of the LEDs 111 and a light distribution angle of the light emitting device 1. As used herein, the term "light distribution angle of the light emitting device 1" refers to an angle that is twice an angle formed between a line connecting the light emitting device 1 and a center of an emission pattern, and a line connecting the light emitting device 1 and a position on the emission pattern at which an illuminance is a half of a maximum illuminance in the emission pattern. This light distribution angle corresponds to a "half beam angle", which is an angle in a spatial emission pattern at which the illuminance is a half of a maximum illuminance of the spatial emission pattern.

For example, the light incident end surface 151i may have a size in a range of 0.2 mm$^2$ to 20 mm$^2$, and may be larger than the size of the emission surface of the LED 111. Further, the light exit end surface 151o may have a size in a range of 0.2 mm$^2$ to 100 mm$^2$. The height (the length in the Z direction) of the light guide member array 15 may be in a range of 3 mm to 400 mm. The light distribution angle of the light emitting device 1 may be set to be in a range of 20 degrees to 120 degrees as the half beam angle.

As illustrated in FIG. 3A, in a central portion of the light guide member array 15, a total of twelve light guide members 151 are arranged in a matrix pattern, with three along the X direction and four along the Y direction. Further, in an end portion of the light guide member array 15 on the positive X direction side, three light guide members 151 are arrayed along the Y direction, and in an end portion of the light guide member array 15 on the negative X direction side, three light guide members 151 are arrayed along the Y direction.

Next, inclinations and distances of the central axes between the plurality of light guide members 151 will be described with reference to FIG. 3B.

A light guide member 151a of the light guide members 151 includes a light incident end surface 151ai and a light exit end surface 151ao. The light guide member 151a is an example of a first light guide member. A central axis 151ac of the light guide member 151a is an axis passing through both the center of the light incident end surface 151ai and the center of the light exit end surface 151ao.

Further, a light guide member 151b of the light guide members 151 includes a light incident end surface 151bi and a light exit end surface 151bo. The light guide member 151b is an example of a second light guide member. A central axis 151bc of the light guide member 151b is an axis passing through both the center of the light incident end surface 151bi and the center of the light exit end surface 151bo.

The central axis 151ac is inclined at an inclination angle θ with respect to the Z direction. The central axis 151bc is not inclined with respect to the Z direction. Therefore, the central axis 151ac and the central axis 151bc are inclined with respect to each other at the inclination angle θ.

Further, an interaxial distance di is an interaxial distance between the central axis 151ac and the central axis 151bc on the light incident end surface 151i side. An interaxial distance do is an interaxial distance between the central axis 151ac and the central axis 151bc on the light exit end surface 151o side. The interaxial distance do is longer than the interaxial distance di. In other words, the interaxial distance between the central axis 151ac and the central axis 151bc is greater on the light exit side than on the light incident side.

With this configuration, the light emitting device 1 including the light guide member array 15 can emit a diverging light that spreads while traveling in the positive Z direction.

Further, as illustrated in FIG. 3C, central axes 151c (collective designation) of respective the light guide members 151 are inclined in directions different from each other in a random manner. The inclinations of the central axes 151c of each of the light guide members 151 illustrated in FIGS. 3A, 3B, and 3C are exemplary, and the light guide member array 15 can be configured such that the central axis 151c of each of the light guide members 151 is inclined in any appropriate direction.

The quantity, arrangement, size, inclination of the central axis, and the like of the light guide members 151 are not limited to those described above and can be selected appropriately according to the purpose. Further, the light guide members 151 each having the square cross-sectional shape is illustrated above, but the light guide members 151 may have other cross-sectional shape. For example, the light guide members 151 may have a rectangular, polygonal, circular, or elliptical cross-sectional shape. The same applies to the cross-sectional shape of the spacer through hole 121 and the cross-sectional shape of the holding hole 144.

Furthermore, in the present embodiment, an example is illustrated in which light propagates inside the light guide member 151 by being totally reflected at the lateral surfaces of the light guide member 151, but the propagation of light inside the light guide member 151 may be caused by other configuration. For example, a deflection surface such as a reflection surface can be provided on a lateral surface of the light guide member 151 to deflect light at the lateral surface of the light guide member 151, which allows light to propagate inside the light guide member 151.

Configuration Example of Holder Member 14

Next, FIG. 4 is a diagram schematically illustrating an example of a configuration of the holder member 14. FIG. 4 is a schematic perspective view of the holder member 14 when viewed from the positive Z direction side. As illustrated in FIG. 4, the engagement through holes 141 are formed in a front surface portion 142 located on the positive Z direction side of the holder member 14. Further, eighteen holding holes 144 are formed in a bottom surface portion 143 provided on the negative Z direction side of the holder member 14. In FIG. 4, some of the eighteen holding holes 144 are hidden in the drawing.

Each holding hole 144 is a through hole having a square or rectangular cross-section. When an end portion of each light guide member 151 on the light incident end surface 151i side is inserted into the holding hole 144, the holding hole 144 can hold the end portion. The holding hole 144 is an example of a holding member that holds the end portion of each light guide member 151 on the light incident end surface 151i side.

As illustrated in FIG. 3C, the centers of the light incident end surfaces 151i are not arrayed at equal intervals, so that the holding holes 144 are arranged at uneven intervals in accordance with the positions of the light incident end surfaces 151i.

In the example herein, the light guide member array 15 contains a soft silicone resin, so that narrow portions of the light guide member array 15 on the light incident end surface 151i side easily moves due to impact or the like. When the narrow portions move, a light guide state of light guided inside the light guide members 151 may change.

In the present embodiment, when the end portion of each of the light guide members 151 on the light incident end surface 151i side is held by a corresponding one of the holding holes 144, a positional change of the narrow portion, on the light incident end surface 151i side, of each light guide member 151 can be reduced.

Configuration Example of LED 111 and LED Mounting Substrate 11

Figure 5:
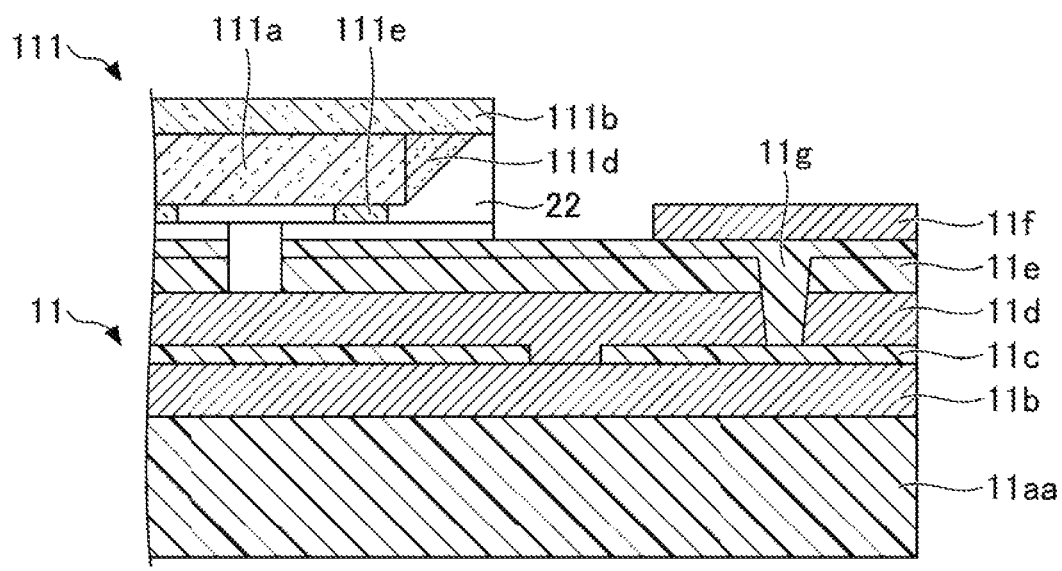
FIG. 5 is a diagram schematically illustrating a configuration example of an LED and an LED mounting substrate according to one embodiment.

Next, the configuration of the LED 111 and the LED mounting substrate 11 will be described with reference to FIG. 5. FIG. 5 is a diagram illustrating an example of the configuration of the LED 111 and the LED mounting substrate 11.

As illustrated in FIG. 5, the LED 111 is a package including a light emitting element 111a, a phosphor layer 111b, a fillet 111d, and positive and negative electrodes 111e. The LED 111 may include other configurations.

The phosphor layer 111b is bonded to the light emitting element 111a using the fillet 111d as a bonding member. A lower surface and lateral surfaces of the light emitting element 111a, and the fillet 111d, are covered with a white resin 22 containing light-reflecting particles. Lateral surfaces of the phosphor layer 111b are not covered with the white resin 22. The positive and negative electrodes 111e are exposed from the white resin 22 and connected to the wirings of the LED mounting substrate 11.

The light-reflecting particles contained in the white resin 22 are particles having light reflectivity with respect to the light emitted from the LEDs 111, and are, for example, white titanium oxide particles, glass beads, calcium carbonate particles, aluminum powder, mica particles, or the like.

Further, as illustrated in FIG. 5, in the LED mounting substrate 11, a first insulating layer 11b, a first copper foil 11c, a second insulating layer 11d, a second copper foil 11e, a third insulating layer 11f, and other components are layered in this order on a base substrate 11aa. The first copper foil 11c and the second copper foil 11e are conductive with each other via a copper plating 11g.

Configuration Example of Periphery of LED 111

Figure 6A:
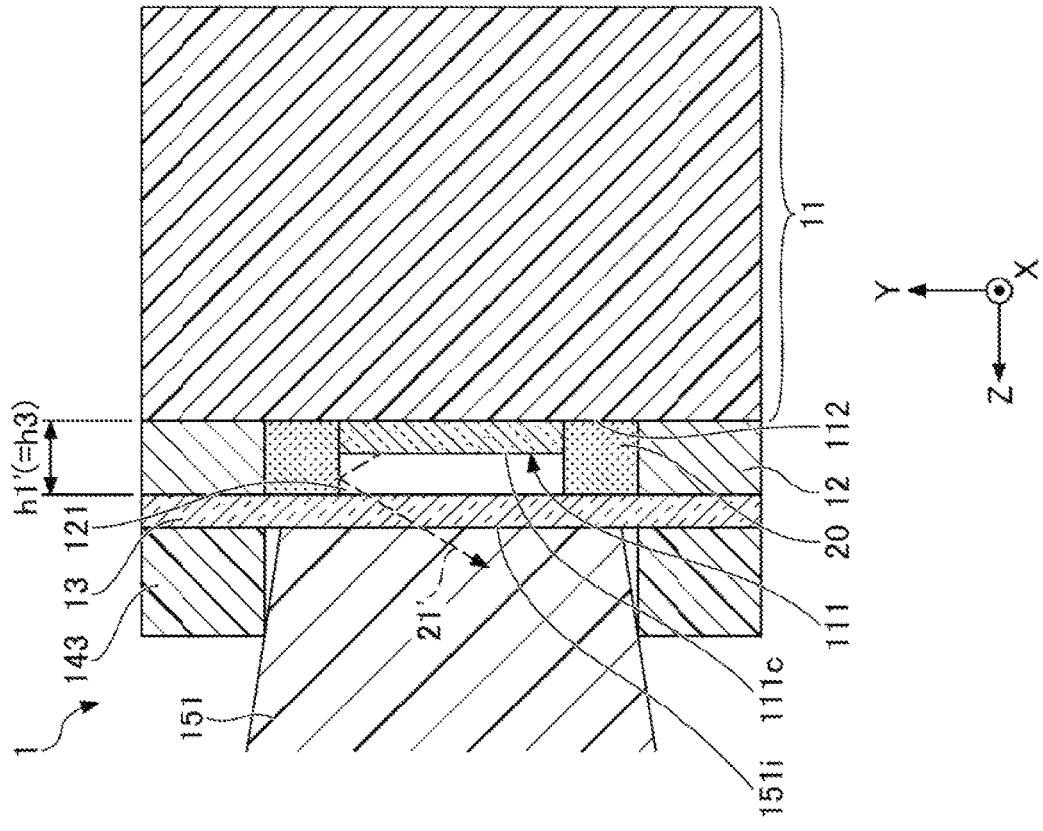
FIGS. 6A and 6B are cross-sectional views schematically illustrating a configuration around the LED according to one embodiment, where
Figure 6B:
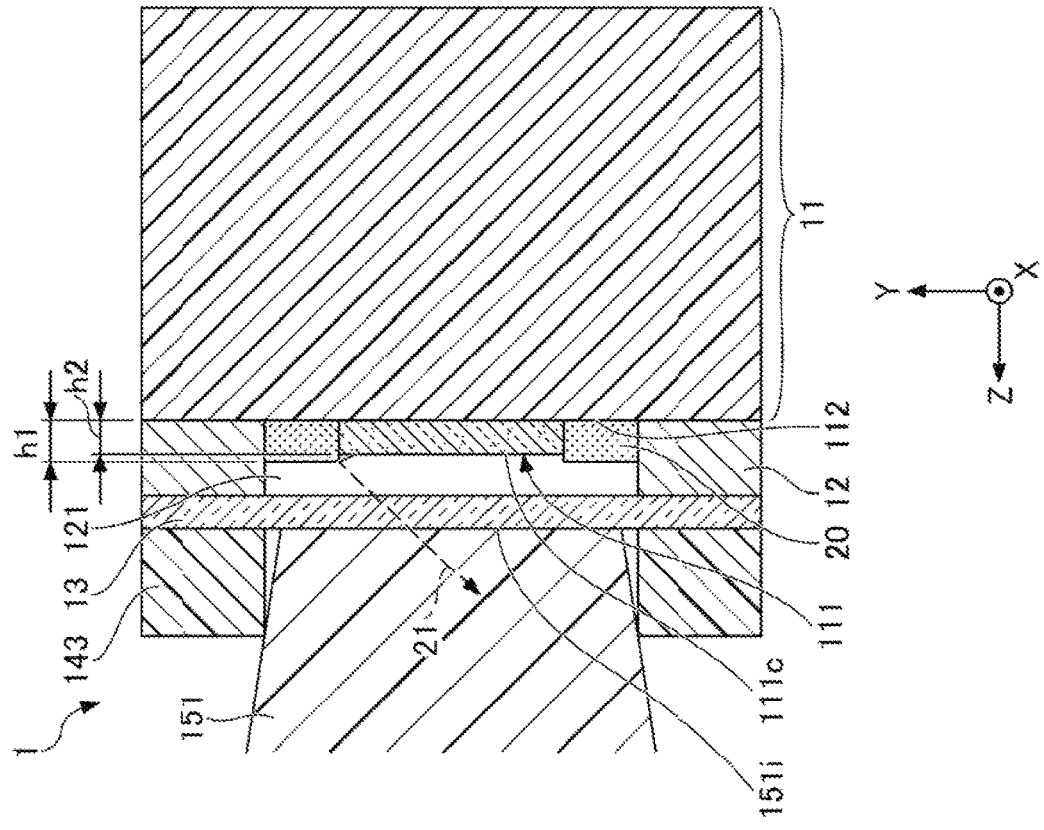

Next, a configuration around the LED 111 will be described with reference to FIGS. 6A and 6B. FIGS. 6A and 6B are cross-sectional views schematically illustrating the configuration around the LED 111. FIG. 6A illustrates a first example, and FIG. 6B illustrates a second example. FIGS. 6A and 6B illustrate a configuration around the LED 111 after each of the members of the light emitting device 1 are connected to each other. Further, the first example illustrated in FIG. 6A and the second example illustrated in FIG. 6B are different from each other only in the height (thickness) of the white resin 20 in the Z direction.

As illustrated in FIGS. 6A and 6B, the light emitting device 1 includes the LED 111 disposed on the placement surface 112 of the LED mounting substrate 11. Further, in the light emitting device 1, the white resin 20, the spacer 12, the glass plate 13, the bottom surface portion 143 of the holder member 14, and the end portion on the light incident end surface 151i side of the light guide member 151 are located around the LED 111. The LED 111 is disposed at the position at which the spacer through hole 121 of the spacer 12 is defined.

In the present embodiment, a height of the white resin 20 with respect to the placement surface 112 is greater than a height of an upper surface 111c (the light emitting surface) of the LED 111 with respect to the placement surface 112, and is equal to or less than a height of the spacer 12 with respect to the placement surface 112. In the present embodiment, the upper surface of the phosphor layer 111b (the upper surface 111c) corresponds to the light emitting surface of the light source.

FIG. 6A illustrates a case in which a height h1 of the white resin 20 with respect to the placement surface 112 is greater than a height h2 of the phosphor layer 111b, which is the light emitting surface of the LED 111, with respect to the placement surface 112. FIG. 6B illustrates a case in which a height h1' of the white resin 20 with respect to the placement surface 112 is equal to a height h3 of the spacer 12 with respect to the placement surface 112.

A portion of the light emitted from the LED 111 may propagate in oblique directions from the LED 111. A large portion of light propagating in oblique directions from the LED 111 does not enter the light guide member 151, which leads to reduction in the incidence efficiency of the light from the LED 111 on the light guide member 151.

In the present embodiment, by providing the white resin 20, the light propagating in oblique directions from the LED 111 can be reflected toward an area directly above the LED 111. Accordingly, light propagating obliquely from the LED 111 can be guided to and caused to enter the light incident end surface 151i, and the deterioration of the incidence efficiency of the light can be suppressed. Propagating light 21 illustrated in FIG. 6A and propagating light 21' illustrated in FIG. 6B are each an example of light that propagates obliquely the LED 111, and are reflected by the white resin 20 and guided to the light incident end surface 151i.

While the white resin 20 is provided in the present embodiment, the white resin 20 is not necessarily provided. Also, and the height h1 of the white resin 20 may be smaller than the height h2 of the phosphor layer 111b.

Further, as illustrated in FIGS. 6A and 6B, a surface of the glass plate 13 in the negative Z direction is in contact with a surface of the spacer 12 in the positive Z direction. Further, a surface of the glass plate 13 in the positive Z direction is in contact with the light incident end surface 151i of the light guide member 151.

With the glass plate 13 disposed between the light incident end surface 151i and the spacer 12, the light incident end surface 151i can be hindered from moving to the LED 111 side, and a change in the distance between the LED 111 and the light guide member 151 can be reduced. The distance between the LED 111 and the light guide member 151 is defined by a thicknesses of the spacer 12 and a thicknesses of the glass plate 13.

Coupling Example of Each Member

Figure 7A:
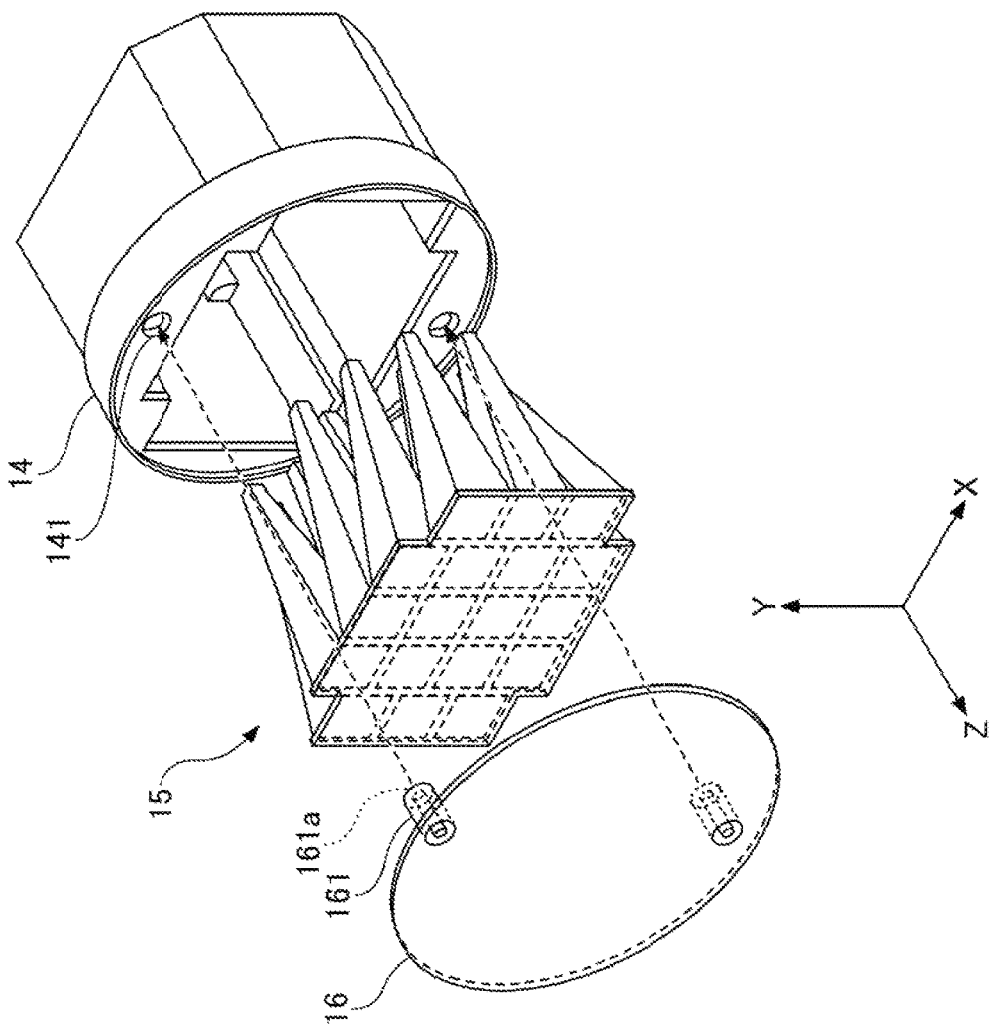
FIGS. 7A and 7B are schematic exploded perspective views of the holder member, the light guide member array, and a window member, where
Figure 7B:
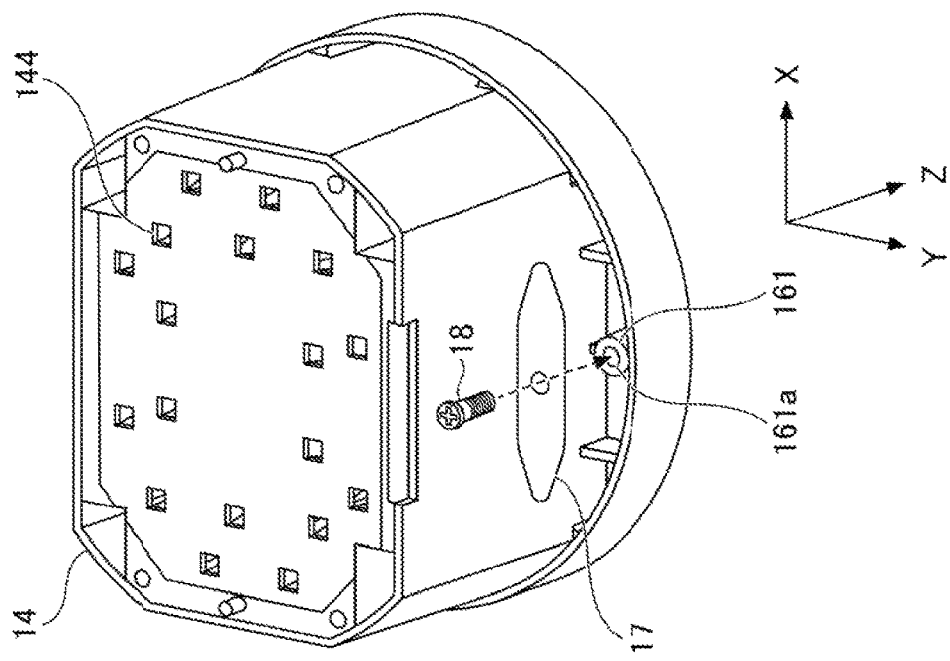

Next, coupling between members will be described with reference to FIGS. 7A and 7B and FIG. 8. FIGS. 7A and 7B are exploded perspective views schematically illustrating coupling among the holder member 14, the light guide member array 15, and the window member 16. FIG. 7A is a diagram when viewed from the positive Z direction side, and FIG. 7B is a diagram when viewed from the negative Z direction side. Further, FIG. 8 is an exploded perspective view schematically illustrating coupling among the LED mounting substrate 11, the spacer 12, the glass plate 13, and the holder member 14.

As illustrated in FIG. 7A, after the light guide member array 15 is housed inside the holder member 14 and held therein, the window member 16 is attached to the holder member 14 so that the protruding portions 161 are fitted into respective engagement through holes 141.

After that, as illustrated in FIG. 7B, the flat spring 17 is disposed between the protruding portion 161 and the fixing screw 18 with the protruding portion 161 fitted into the engagement through hole 141, and the fixing screw 18 is screwed into the female screw hole 161a of the protruding portion 161, so that the holder member 14, the light guide member array 15, and the window member 16 are coupled together.

Figure 8:
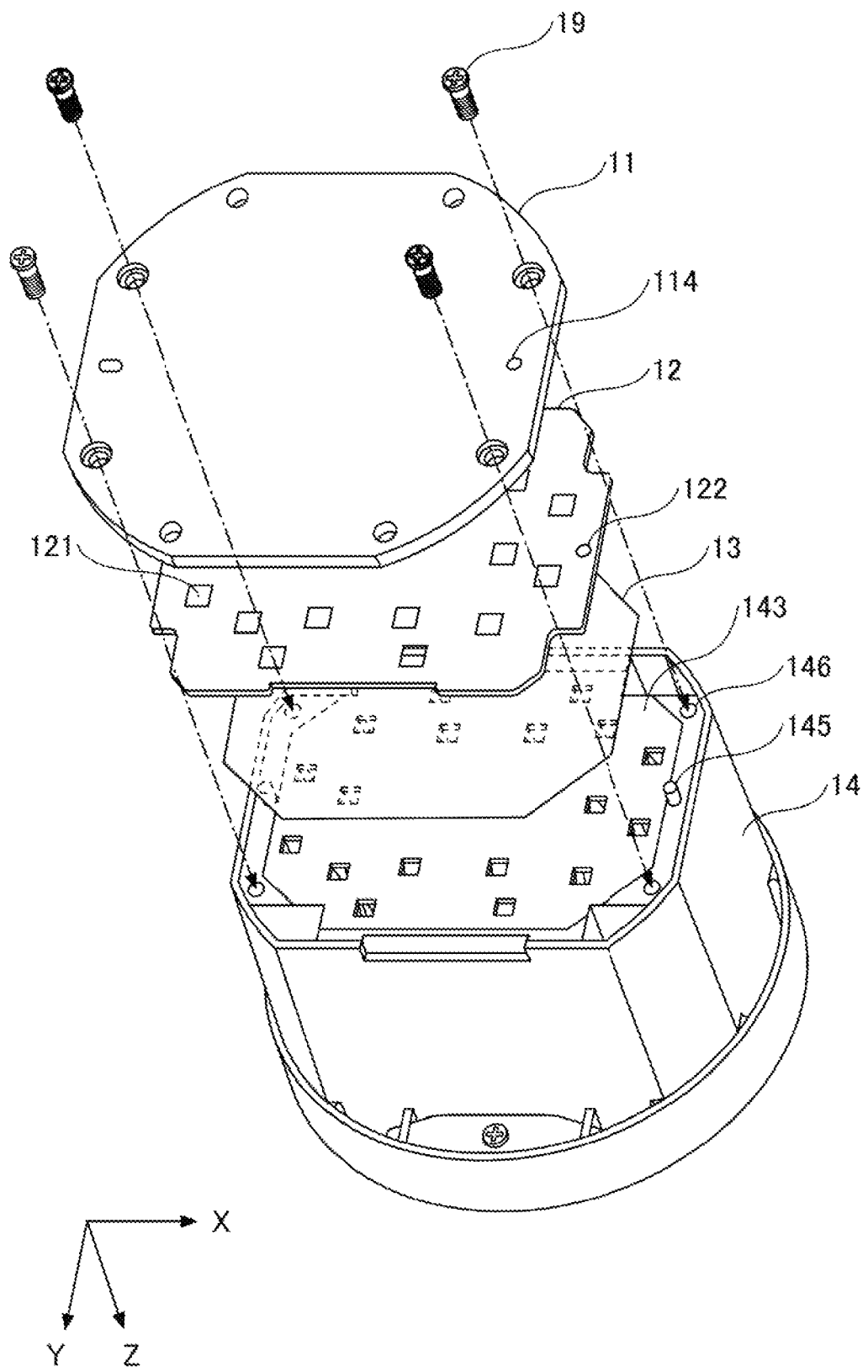
FIG. 8 is a schematic exploded perspective view of the LED mounting substrate, a spacer, a glass plate, and the holder member.

Further, as illustrated in FIG. 8, the LED mounting substrate 11, the spacer 12, and the glass plate 13 are aligned in this order, and in this aligned state, are brought into contact with a surface of the bottom surface portion 143 of the holder member 14 in the negative Z direction. At this time, positioning protruding portions 145 of the holder member 14 are inserted into respective positioning through holes 122 in the spacer 12 and respective positioning through holes 114 in the LED mounting substrate 11.

This allows alignment in the array plane so that each of the light guide members 151 faces a respective one of the LEDs 111 across a respective one of the spacer through holes 121. At least two or more sets of the positioning protruding portion 145, the positioning through hole 122, and the positioning through hole 114 are preferably provided.

After that, the securing screws 19 are screwed into the female screw holes 146 to couple the LED mounting substrate 11, the spacer 12, and the glass plate 13 to the holder member 14.

Effects of Glass Plate 13, Window Member 16, and Flat Spring 17

Figure 9A:
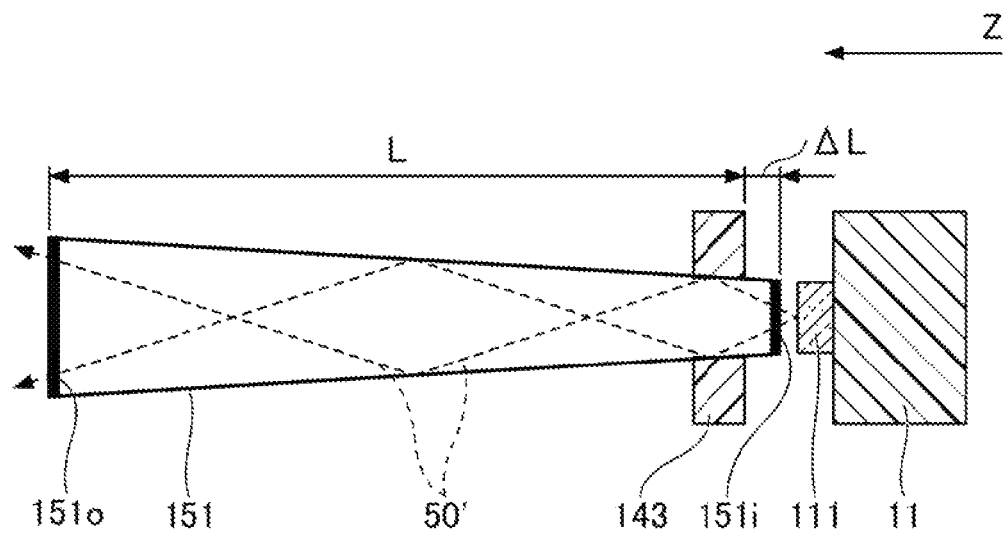
FIGS. 9A and 9B are diagrams schematically illustrating working examples of the glass plate according to one embodiment, where
Figure 9B:
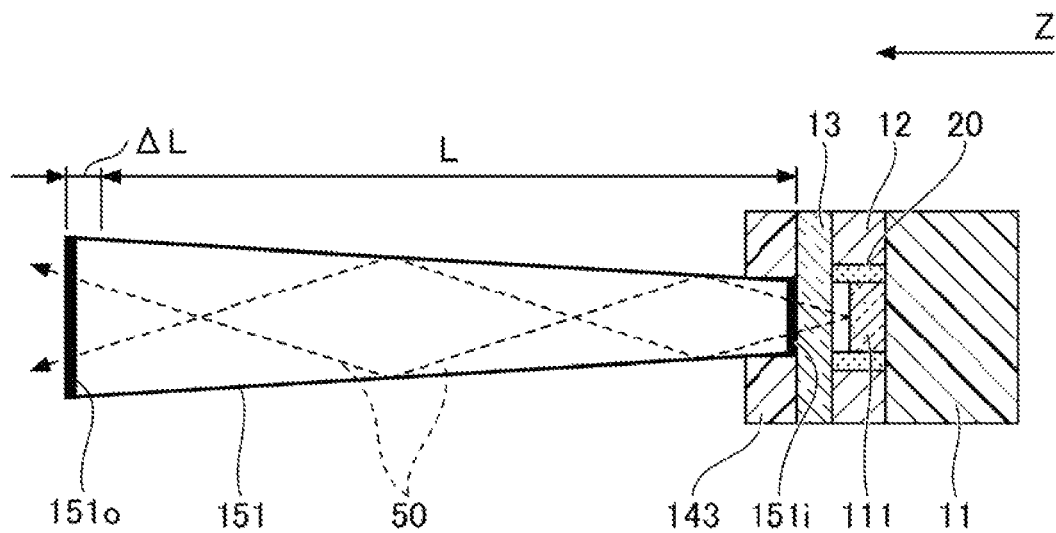

Next, the effects of the glass plate 13, the window member 16, and the flat spring 17 will be described with reference to FIGS. 9A and 9B and FIG. 10. First, FIGS. 9A and 9B are diagrams illustrating an example of the effect of the glass plate 13. FIG. 9A is a diagram illustrating a comparative example in which the glass plate 13 is not provided, and FIG. 9B is a diagram illustrating a case in which the glass plate 13 according to the present embodiment is provided.

FIG. 9A and FIG. 9B illustrate a configuration of the light guide member 151 having a length L in the Z direction, and configurations around the LED 111. Further, FIG. 9A and FIG. 9B illustrate a case in which the light guide member 151 is expanded due to heat generated by the light emitting device or due to an increase in temperature in the periphery of the light emitting device, resulting in an increase in length along the Z direction by an elongation amount ΔL. The light guide member 151 illustrated in each of FIGS. 9A and 9B indicates one of light guide members 151 included in the light guide member array 15.

In FIG. 9A, the glass plate 13 is not provided, so that the light incident end surface 151i indicated by the thick line is shifted by the elongation amount ΔL in the negative Z direction. Accordingly, the distance between the light incident end surfaces 151i and the LED 111 is shortened by the elongation amount ΔL, compared to a case in which the light guide member 151 is not elongated.

When a surface of the phosphor layer 111b that serves as the light emitting surface of the LED 111 comes into contact with the light incident end surface 151i of the light guide member 151 due to a change in the distance between the light incident end surface 151i and the LED 111, an air layer defined between the phosphor layer 111b and the light incident end surface 151i is eliminated. Accordingly, a light component reflected at an interface with the air layer toward the LED 111 and is incident again on the phosphor layer 111b decreases, and a color of light emitted by the light emitting device 1 may shift to a blue side (high color temperature side).

Further, if the light guide member 151 expands due to, for example, the influence of heat and thus the light incident end surface 151i comes into contact with the LED 111, not only change in color of the irradiated light but also failure of the LED 111 due to this contact may occur. On the other hand, if the distance between the light incident end surface 151i and the LED 111 is increased to avoid such contact, the incidence efficiency of the light on the light incident end surface 151i may be reduced.

In other words, in view of incidence efficiency, it is preferable that the phosphor layer 111b of the LED 111 be located as close as possible to the light incident end surface 151i to improve the incidence efficiency. However, when the phosphor layer 111b is located excessively close to the light incident end surface 151i, the phosphor layer 111b and the light incident end surface 151i come into contact with each other when the light guide member 151 expands, which may cause a change in color of light emitted from the light emitting device 1 or failure of the LED 111.

On the other hand, if a structure is employed in which the distance between the upper surface 111c of the LED 111 and the light incident end surface 151i is increased, efficiency of incidence of light emitted from the LED 111 on the light incident end surface 151i may be reduced.

In the present embodiment, with the glass plate 13, the light incident end surface 151i can be prevented from being shifted toward the LED 111 side, and the distance between the light incident end surface 151i and the LED 111 defined by the spacer 12 and the glass plate 13 is maintained. Accordingly, contact between the light incident end surface 151i and the upper surface 111c of the LED 111 can be prevented. Thus, the change in the color light emitted from the light emitting device 1 can be reduced. Further, failure of the LED 111 due to this contact can also be reduced.

Furthermore, the distance between the light incident end surface 151i and the LED 111 can be greatly reduced without employing a structure in which the distance between the light incident end surface 151i and the LED 111 is increased, contact between the light incident end surface 151i and the LED 111 can be prevented without causing significant reduction in incidence efficiency of light on the light incident end surface 151i.

Further, also when the upper surface 111c of the LED 111 and the glass plate 13 come into contact with each other, an air layer is eliminated from between the upper surface 111c of the LED 111 and the glass plate 13, which may cause a change in color in a similar manner. In contrast, with the spacer 12 disposed between the upper surface 111c of the LED 111 and the glass plate 13, the air layer is secured between the upper surface 111c of the LED 111 and the glass plate 13. Accordingly, change in color of light, failure due to contact, and the like can be reduced or prevented.

While an example is illustrated in FIG. 9B in which the light exit end surface 151o indicated by a thick line is allowed to be shifted in the Z direction, and the light exit end surface 151o is caused to be shifted by the elongation amount ΔL in the positive Z direction, a configuration may also be employed in which the light exit end surface 151o is pressed by a window member or the like to hinder elongation of the light guide member 151 in the positive Z direction.

Further, while the light guide member 151 having a central axis parallel to the Z direction is illustrated in FIGS. 9A and 9B, a similar effect can also be obtained when the light guide member 151 has a central axis inclined with respect to the Z direction.

Figure 10:
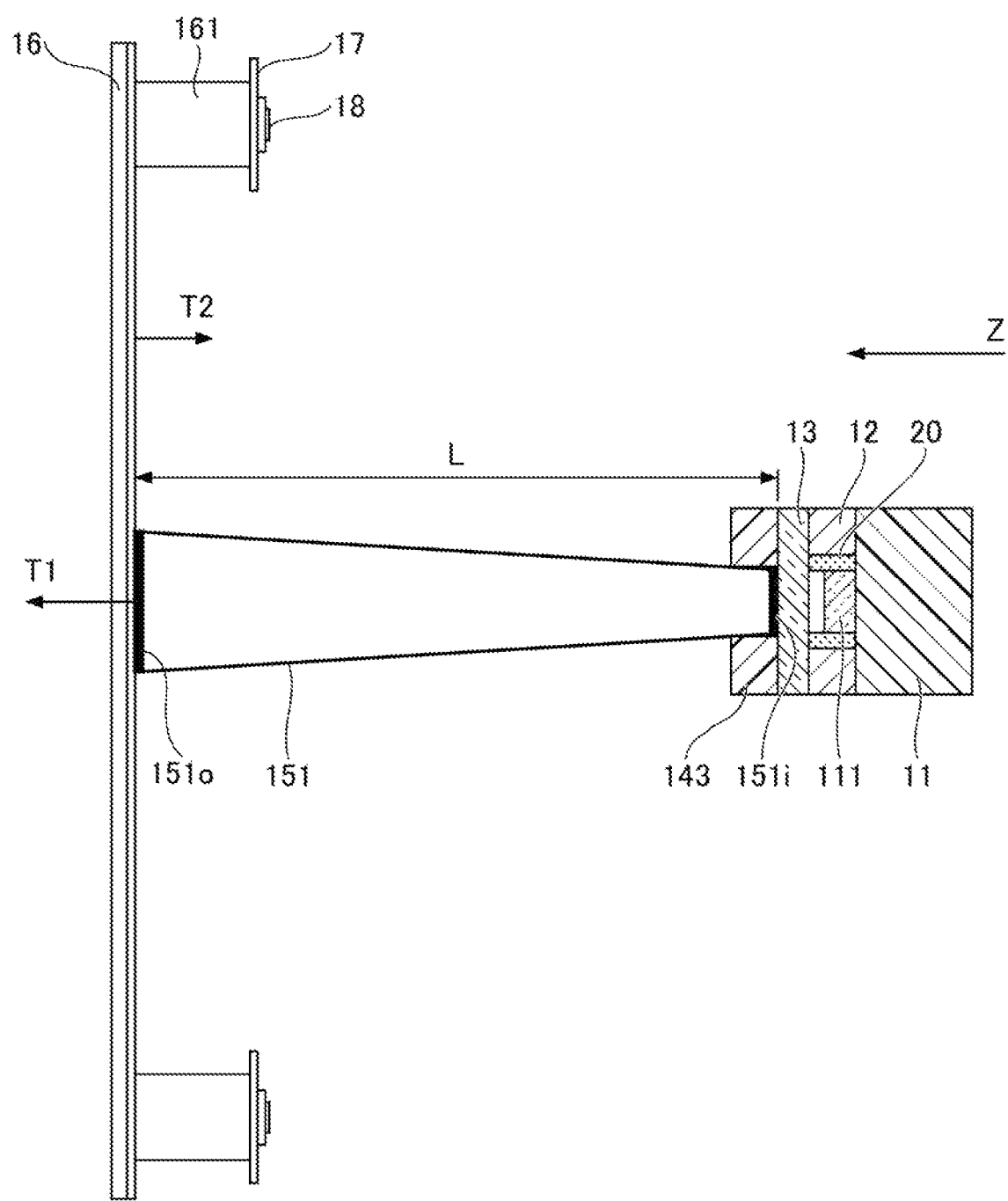
FIG. 10 is a diagram schematically illustrating a working example of the window member and a flat spring according to one embodiment.

Next, FIG. 10 is a diagram schematically illustrating an example of the effects of the window member 16 and the flat spring 17. FIG. 10 illustrates one light guide member 151 of the light guide members 151 included in the light guide member array 15.

While the light guide member 151 may be allowed to expand/contract at the light exit end surface 151o side (see FIG. 9B), the shift of the light exit end surface 151o may cause a change in characteristics of the irradiated light. Thus, it is more preferable to hinder the shift of the light exit end surface 151o. However, if the light exit end surface 151o is pressed in order to hinder the shift of the light exit end surface 151o, then, for example, when the elongation amount is increased, stress may be exerted to the light guide member 151. Such a stress may cause a change in the shape of the light guide member 151, which may cause a change in the orientation of the irradiated light, resulting in the state of light distribution.

In the present embodiment, the window member 16 is brought into contact with the light exit end surface 151o to press the light exit end surface 151o at which elongation occurs, so that shift of the light exit end surface 151o is hindered. Further, when the elongation amount is increased, the pressing force exerted by the window member 16 is reduced by the effect of the flat spring 17.

In FIG. 10, when the light guide member 151 is elongated due to thermal expansion or the like, the light exit end surface 151o presses the window member 16 with a force T1, and the window member 16 presses the light exit end surface 151o with a pressing force T2 that is an opposite force against the force T1. With the pressing force T2, the window member 16 can hinder the movement of the light exit end surface 151o.

Further, the window member 16 is secured by the securing screws 18, with the flat springs 17 between the window member 16 and the holder member 14. The flat spring 17 is an elastic member and thus easily deforms. Accordingly, when the elongation amount of the light guide member 151 is increased and the force T1 is increased, the flat spring 17 deforms. Such deformation of the flat spring 17 allows for reducing the pressing force exerted by the window member 16.

In this manner, a stress exerted to the light guide member 151 when, for example, the light guide member 151 is elongated by a large amount can be reduced, which allows for reducing the change in the state of light 50 guided inside the light guide member 151, so that change in the state of light distribution of the light emitted from the light emitting device 1 can be reduced.

It is preferable to determine the spring constant of the flat spring 17 according to an acceptable amount of stress to be exerted to the light guide member 151, etc., such that the stress exerted to the light guide member 151 can be reduced while the window member 16 hindering shift of the light exit end surface 151o.

Effects of Light Emitting Device 1

As described above, in the present embodiment, the defining member 40 is employed that includes the spacer 12 (the light passage member) that allows light emitted from each LED 111 (the light source) to pass between the respective LED 111 and the light incident end surface 151i of a corresponding light guide member 151 on which the light from the respective LET) 111 is incident, and the glass plate 13 (the light transmission member) that transmits light between the spacer 12 and the light incident end surface 151i. The respective LED 111 and the corresponding light incident end surface 151i are located apart from each other by the spacer 12 and the glass plate 13. With this structure, it is possible to prevent contact between the respective light source and the respective light guide member while reducing the reduction in the light incidence efficiency on the light guide member.

With the glass plate 13 hindering the shift of the light incident end surfaces 151i toward the LED 111 side, contact between the upper surface 111c of the respective LED 111 and the corresponding light incident end surface 151*i* can be prevented even when the respective light guide member 151 is elongated due to thermal expansion or the like. Accordingly, change in characteristics, such as the color, of light emitted from the light emitting device 1 caused by such contact can be prevented, and also failure of the LEDs 111 due to such contact can be prevented.

Furthermore, an increase in the distance between the upper surface 111*c* of the LED 111 and the light incident end surface 151*i* to prevent contact is not necessary, so that reduction in efficiency of incidence of light emitted from the LED 111 on the light incident end surface 151*i* can be reduced.

Further, in the present embodiment, the white resin 20 (resin layer) containing the light-reflecting particles is disposed on the placement surface 112 along the outer periphery of each LED 111. A. height of the white resin 20 with respect to the placement surface 112 is greater than a height of the upper surface 111*c* of each LED 111 with respect to the placement surface 112, and is equal to or less than a height of the spacer 12 with respect to the placement surface 112.

With this configuration, light propagating from the LED 111 in an oblique direction with respect to the LED 111 is reflected at the white resin 20 toward the center of the LED 111. Accordingly, light propagating in an oblique direction from the LED 111 can be guided to the light incident end surface 151*i* and caused to enter the light guide member 151, so that reduction in the incidence efficiency of the light can be reduced.

Further, in the present embodiment, the holding hole 144 (holding member) holds the end portion of each light guide member 151 on the light incident end surface 151*i* side. This structure allows for reducing the change in position of the narrow portion on the light incident end surface 151*i* side of each light guide member 151, so that the characteristics of the light emitted from the light emitting device 1 can be stabilized.

Further, in the present embodiment, the window member 16 (pressing member) presses the light exit end surface 151*o* of the light guide member 151. This allows for reducing the change in the characteristics of the emitted light caused by the shift of the light exit end surface 151*o*.

Further, in the present embodiment, the flat spring 17 (elastic member) reduces the pressing force exerted by the window member 16 onto the light guide members 151. Accordingly, if, for example, the light guide members 151 elongate by a large amount, the stress exerted to the light guide members 151 can be reduced. This allows for reducing the change in the state of the light 50 guided inside the light guide members 151, resulting in reducing the change in the characteristics, such as the state of light distribution of the light emitted from the light emitting device 1.

The light exit end surface 151*o* and the window member 16 may be disposed without being in contact with each other to have an allowance for expansion/contraction of the end portions of the light guide members 151 on the light exit end surface 151*o* side in a direction intersecting the light exit end surface 151*o*. In other words, the end portions of the light guide members 151 on the light exit end surface 151*o* side may be allowed to expand or contract in the direction intersecting the light exit end surface 151*o*. Such a configuration also allows for reducing the stress exerted to the light guide members 151 when, for example, the light guide members 151 is elongated at a large amount, so that the change in the state of the light 50 guided inside the light guide member 151 can be reduced, resulting in a reduction in change in the state of the light distribution of the light emitted from the light emitting device 1.

In the present embodiment, each light guide member 151 has the tapered shape that narrows toward the light incident end surface 151*i*.

Further, the light guide members 151 include the light guide member 151*a* (first light guide member) and the light guide member 151*b* (second light guide member) in the array plane along the light incident end surface 151*i* (the light incident end surfaces 151*i* of the light guide members 151*a* and 151*b* lie in the same plane), the light guide member 151*a* having a central axis 151*ac* inclined with respect to a central axis 151*bc* of the light guide member 151*b*.

The interaxial distance between the central axis 151*ac* of the light guide member 151*a* and the central axis 151*bc* of the light guide member 151*b* is greater on the light exit side than on the light incident side.

According to these configurations, light emitted from the light emitting device 1 can be caused to diverge so as to obtain a desired state.

The light emitting device 1 can be configured such that light emission of the plurality of LEDs 111 can be individually controlled to allow various adjustments in light emission position, light emission direction, light emission region, or the like of the light emitting device 1.

Modification Example

Next, a light emitting device 1*a* according to a modification example will be described. Components that are the same as those described above in the embodiment will be denoted by the same reference numerals, and repetitive descriptions thereof will be omitted when appropriate.

In the embodiment described above, a configuration is exemplified in which the holder member 14 is provided with the holding hole 144, which is an example of a holding member that holds the end portion of each light guide member 151 on the light incident end surface 151*i* side, but other configuration than this may be employed. For example, the end portion of each light guide member 151 on the light incident end surface 151*i* side can be held by a holding member provided in a member separate from the holder member 14.

Figure 11:
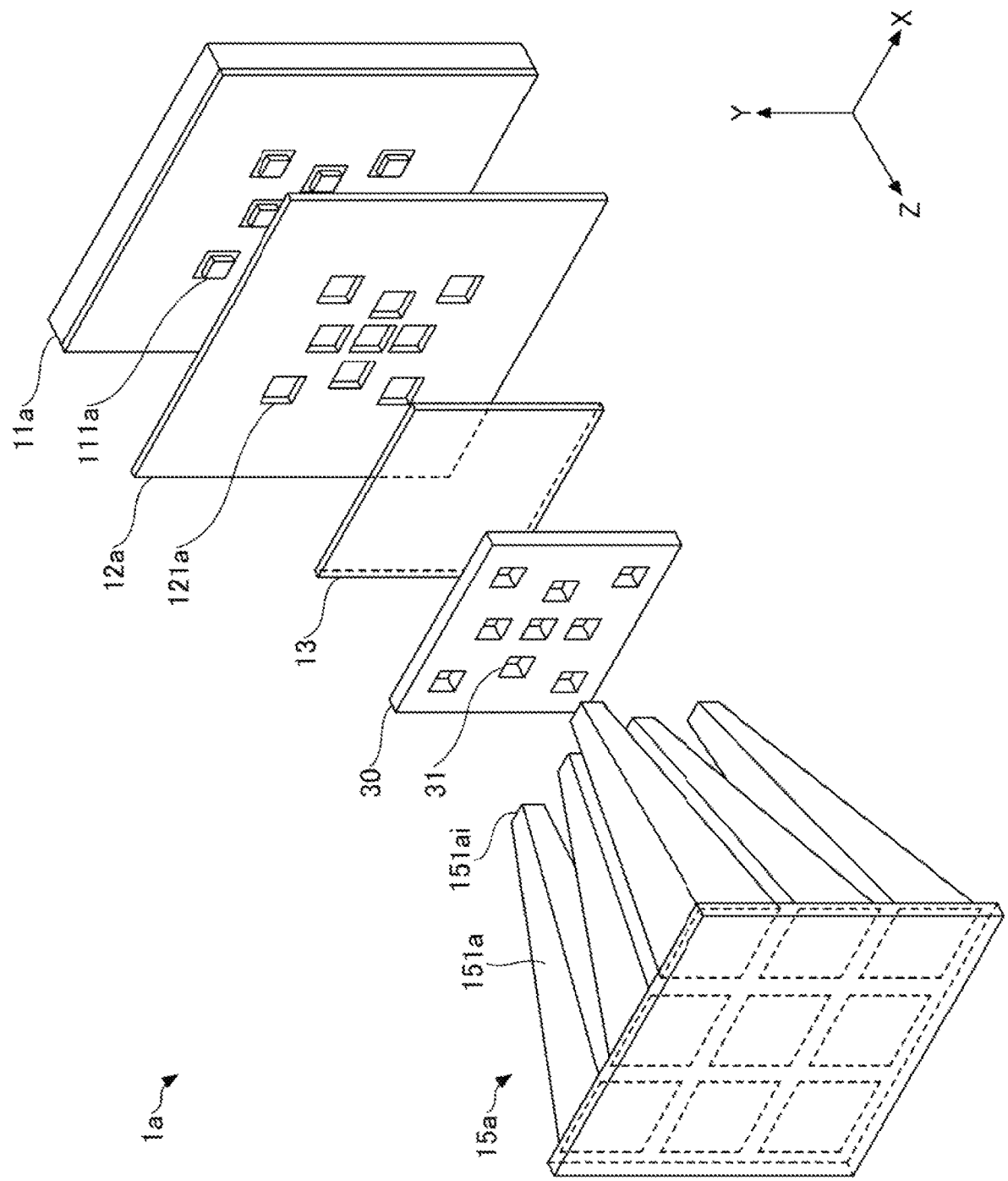
FIG. 11 is an exploded perspective view schematically illustrating a configuration example of a light emitting device according to a modification example.

FIG. 11 is an exploded perspective view schematically illustrating an example of a configuration of the light emitting device 1*a* according to such a modification example. As illustrated in FIG. 11, the light emitting device 1*a* includes an LED mounting substrate 11*a*, a spacer 12*a*, the glass plate 13, a holding member 30, and a light guide member array 15*a*.

In the light emitting device 1*a*, while the quantity, arrangement, and shape of the light guide members 151*a* included in the light guide member array 15*a* differ from those of the light guide members 151 in the light emitting device 1, each light guide member 151*a* has the same function of guiding light as the light guide member 151. Further, while the quantity and arrangement of the LEDs 111*a* are different from those of the LEDs 111, each LED 111*a* has the same function of emitting light as the LED 111. Furthermore, while the quantity and arrangement of the spacer through holes 121*a* are different from those of the spacer through holes 121, each spacer through hole 121*a* has a function of defining a distance similarly to the spacer through hole 121. Therefore, repetitive descriptions of these components will be omitted in the description below.

The holding member 30 defines nine holding holes 31 each corresponding to a respective one of nine light guide members 151a. The holding hole 31 is an example of a holding member that holds an end portion of the light guide member 151a on a light incident end surface 151ai side. With the end portion of the light guide member 151a, on the light incident end surface 151ai side held by the holding holes 31 defined in a member separate from the holder member 14, an effect similar to that of the holding holes 144 can be obtained.

As described above, also in the light emitting device 1a according to the modification example, contact between the light source and the light guide member can be prevented while reducing reduction in the light incidence efficiency on the light guide member, as in the embodiment described above. It is possible to prevent a change in distance between the LED 111a and the light guide member 151a from causing contact between a light emitting surface of the LED 111a and the light incident end surface 151ai of the light guide member 151a. Accordingly, change in characteristics, such as color, of light emitted from the light emitting device 1a, failure of the LED 111a, and the like can be reduced or prevented.

Certain embodiments and the like have been described in detail above, and the present invention is not limited to the embodiment and the like described above, and various modifications and substitutions can be made to the embodiment and the like described above without departing from the scope described in the claims.

For example, in the embodiment described above, a configuration is exemplified in which the light emitting device includes the light guide member array including the light guide members each having the same light guiding characteristics, such as spread angle of emitted light, but other configuration may be employed. The light emitting device may use a narrow-angled light guide member array including narrow-angled light guide members each having a relatively narrow spread angle of emitted light, and a wide-angled light guide member array including wide-angled light guide members each having a relatively wide spread-angle of emitted light.

Further, the light emitting device may use light guide member arrays having three or more mutually different spread angles of emitted light. The light emitting device may use a plurality of types of the light guide member array having mutually different characteristics other than the spread angle of emitted light.

What is claimed is:

1. A light emitting device comprising:
a light source configured to emit light;
a light guide member configured to guide the light and having a light incident end surface on which the light is to be incident; and
a defining member arranged between the light source and the light guide member to define a distance between the light source and the light incident end surface of the light guide member, the defining member including
a light passage member configured to allow the light to pass between the light source and the light incident end surface, and
a light transmission member configured to transmit the light between the light passage member and the light incident end surface, wherein
the light source is spaced apart from the light transmission member.

2. The light emitting device according to claim 1, wherein the light passage member and the light transmission member are in contact with each other.

3. The light emitting device according to claim 1, wherein the light transmission member and the light incident end surface of the light guide member are in contact with each other.

4. The light emitting device according to claim 1, further comprising
a resin layer containing light-reflecting particles and disposed along an outer periphery of the light source on a placement surface on which the light source is placed, wherein
the resin layer has a height with respect to the placement surface greater than a height of a light emitting surface of the light source with respect to the placement surface and equal to or less than a height of the light passage member with respect to the placement surface.

5. The light emitting device according to claim 1, further comprising
a holding member holding an end portion of the light guide member on a light incident end surface side.

6. The light emitting device according to claim 1, further comprising
a pressing member pressing a light exit end surface of the light guide member through which the light exits.

7. The light emitting device according to claim 6, further comprising
an elastic member configured to reduce a pressing force generated by the pressing member.

8. The light emitting device according to claim 1, wherein
the light guide member has an end portion on a light exit end surface side from which the light exits, and
the end portion of the light guide member on the light exit end surface side is allowed to expand or contract in a direction intersecting the light exit end surface.

9. The light emitting device according to claim 1, wherein
the light guide member has a tapered shape that narrows toward the light incident end surface.

10. The light emitting device according to claim 1, further comprising
an additional light guide member including a light incident end surface, the light incident end surfaces of the light guide member and the additional light guide member lie in the same plane, and
a central axis of the light guide member is inclined with respect to a central axis of the additional light guide member.

11. The light emitting device according to claim 10, wherein
an interaxial distance between the central axis of the light guide member and the central axis of the additional light guide member is greater on a light exit side than on a light incident side.

12. The light emitting device according to claim 1, wherein
the light passage member defines a through hole arranged at a position corresponding to the light source so that the light emitted from the light source passes through the through hole.

13. The light emitting device according to claim 7, further comprising
a holding member holding an end portion of the light guide member on a light incident end surface side, wherein
the pressing member is fixed to the holding member via the elastic member.

* * * * *